Oct. 14, 1952     F. J. BUCHER     2,614,150
DIRECT CURRENT CIRCUIT BREAKER TESTER
Filed Jan. 31, 1948
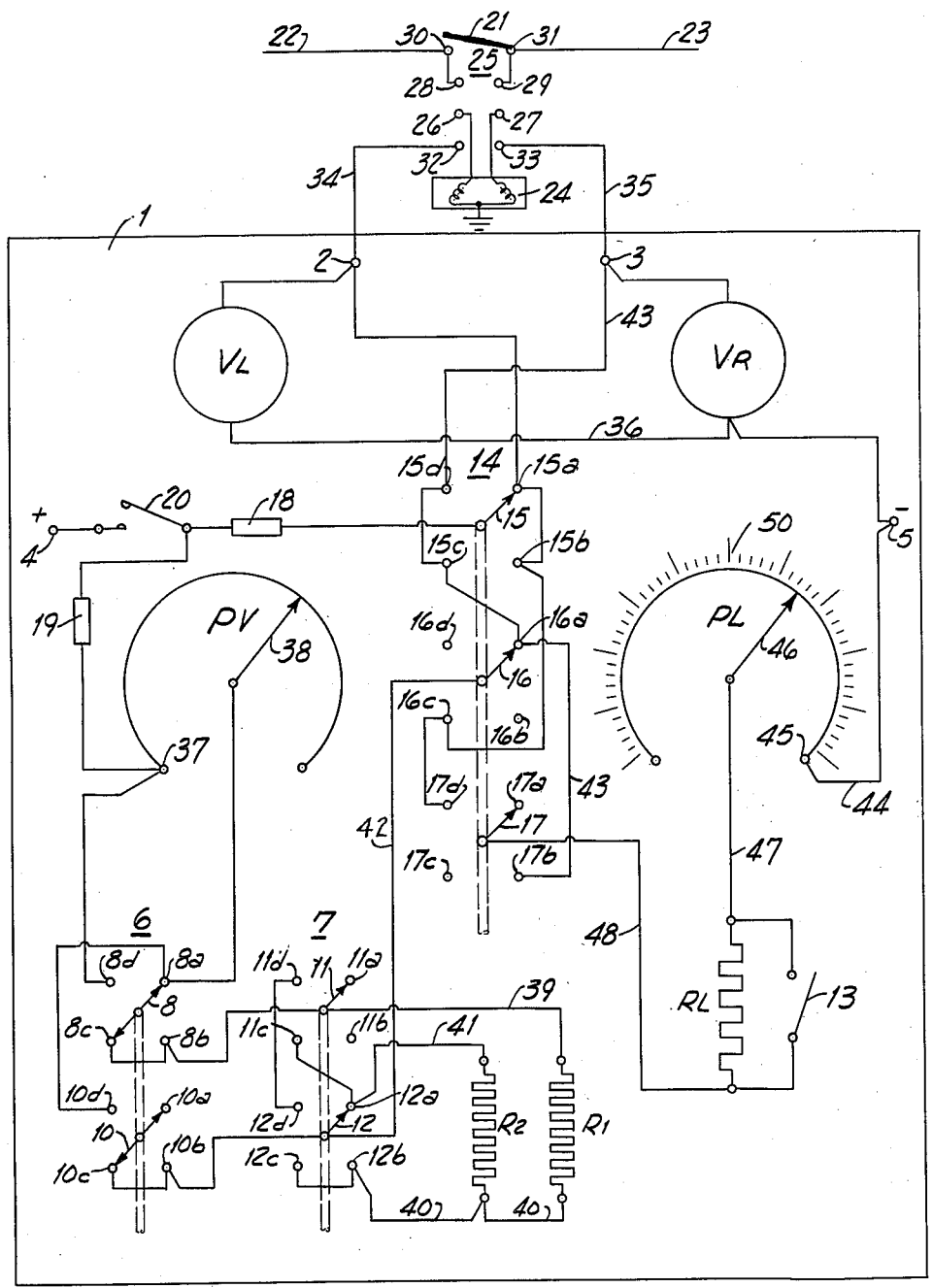
INVENTOR.
FRED J. BUCHER
BY
William D. Carothers
HIS ATTORNEY.

Patented Oct. 14, 1952

2,614,150

UNITED STATES PATENT OFFICE 2,614,150

DIRECT CURRENT CIRCUIT BREAKER TESTER

Fred J. Bucher, Library, Pa.

Application January 31, 1948, Serial No. 5,521

8 Claims. (Cl. 175—183)

This invention relates generally to testing the operating control mechanism of direct current circuit breakers and more particularly to the method and apparatus for testing the operating control mechanism of direct current circuit breakers without removing them from service.

This invention is particularly adapted for use in testing the actuating mechanism of an automatic reclosing direct current circuit breaker without interrupting the service through the circuit breaker. Although this type of equipment may be checked or tested before placing it in service the control apparatus invariably changes causing mis-operation that results in damage to the system and the equipment. This is particularly true in coal mining installations where dampness and dirt invariably is apt to work its way into the sealed control mechanism resulting in mis-operation of the equipment.

A direct current distributing system in a coal mine is patterned after the ordinary circular distributing network wherein several sources of energy are fed at different points of the loop or distribution ring. This ring, or spiderweb network, is sectionalized by a number of automatic reclosing circuit breakers which are designed to function in segregating sections of the network that are subjected to extreme overloads or faults due to short circuits or improper directional feed supplying extreme overloads. If the automatic reclosing controls of the circuit breakers are out of adjustment the circuit breakers frequently function to close the contacts when the overload or short circuit fault has not cleared. This results in repeated closing and opening of the contacts under heavy load which burns them out or further destroys the faulty equipment and increases the hazardous condition of fires or explosions in the coal mine. Improper directional feeding and overload conditions occur daily in a coal mine and the control mechanism is required to frequently open and reclose the circuit breaker.

The principal object of this invention is the provision of a method and apparatus for testing a direct current automatic reclosing mechanism of a circuit breaker in service to insure its operation for each of three conditions, namely that not more than a predetermined load current will flow when the contact is made, the voltage differential between the sections to be connected must be within predetermined limits, and the potential between the sections to be connected must result in a predetermined directional feed of current through the circuit breaker.

Another object is the provision of a compact testing unit enabling one to quickly and accurately check and adjust the automatic resetting control of a direct current circuit breaker without removing or otherwise disturbing the service of the circuit breaker.

Other objects and advantages appear hereinafter in the following description and claims.

A practical embodiment illustrating the principles of this invention is shown in the accompanying drawing which is a diagrammatic view of the circuit breaker tester comprising this invention.

The testing apparatus for the automatic reclosing mechanism of a direct current circuit breaker is mounted within the box or casing 1 which is provided with the terminal test posts 2 and 3 and the power supply terminals, the positive line of which is illustrated at 4 and the negative or line return illustrated at 5. This testing equipment requires the use of two voltmeters the left meter being marked VL and the right meter being marked VR. It also employs the two variable resistors, one indicated at PV, arranged to vary the potential for the test and the other marked PL and arranged to vary the load resistance. A plurality of fixed resistances $R_1$ and $R_2$ are employed in combination with the potential resistor PV by the use of the multiple gang switches such as indicated at 6 and 7. The switch 6 can arrange the resistances $R_1$ and $R_2$ in series or multiple with the resistance PV for the purpose of obtaining the proper voltage to impress on the apparatus being tested. The switch 6 is a two-position, two-gang, one switch of the gang having rotary contact member 8 and the other switch having the rotary contact member 10. Each switch of the gang is provided with four positions indicated at 8a, 8b, 8c and 8d; and 10a, 10b, 10c and 10d, respectively.

The switch 7 is a two-gang, four-position switch, each switch of the gang having a single point contactor 11 and 12, respectively, arranged to connect the four points indicated at 11a, 11b, 11c and 11d; and 12a, 12b, 12c and 12d. The switch 7 is arranged to place $R_1$ and $R_2$ in series, multiple or select either of said resistors for the circuit.

The fixed load resistance RL is employed with the variable load resistance PL and a shunt switch 13 is employed to insert or cut out the fixed resistance RL from the load circuit.

The three-gang selector switch 14 is also employed in combination with the line potential, variable potential and load circuits and each switch gang is provided with a single terminal contact arm such as illustrated at 15, 16 and 17. Each of these rotary contact arms are arranged to selectively engage one of four of their respective contact members 15a, 15b, 15c and 15d; and 16a, 16b, 16c and 16d; and 17a, 17b, 17c and 17d, respectively.

A thirty ampere fuse 18 and a three ampere fuse 19 are also employed for the purpose of protecting the testing equipment. A power switch 20 is arranged when closed to supply power to the testing apparatus for the purpose of energizing the same for testing.

The contact of the direct current circuit breaker is illustrated at 21 and is arranged to connect the positive potential direct current lines 22 and 23. This circuit breaker is provided with an automatic reclosing mechanism indicated at 24 and which is well known in the art. A double-pole, double-throw switch 25 is provided with the switch blade poles 26 and 27 connected to the automatic reclosing control mechanism 24 that has at least two reclosing control circuits line return or ground connection as indicated by the external connections. If the double-pole, double-throw switch 25 is positioned to engage the switch poles 28 and 29, the leads from the mechanism 24 are connected with the contacts 30 and 31 of the circuit breaker 21. If the switch 25 is positioned to engage the switch points 32 and 33 the reclosing mechanism 24 is connected to the terminals 2 and 3 through the wires 34 and 35.

In order to test the automatic reclosing mechanism 24 of the circuit breaker 21 the terminals 2 and 3 are first connected to the switch points 32 and 33 by the leads 34 and 35 and the double-pole, double-throw switch 25 is disconnected from its normal position with the switch poles 28 and 29 and thrown in the opposite direction for connection with the switch poles 32 and 33 thereby removing the control from the circuit breaker 21 and applying the same to the testing unit. The circuit breaker may or may not be in service. The interruption of the automatic reclosing control 24 from service does not alter or otherwise disturb the function of the circuit breaker. Even though the reclosing control 24 is energized during the test it merely functions to operate the magnetic reclosing mechanism which would normally reset the circuit breaker 21 but owing to the fact that the circuit breaker is already closed the operation of the magnetic reclosing mechanism will not disturb the normal function of the circuit breaker 21 and its overload control is still in operation.

When the automatic reclosing mechanism 24 is connected to the terminal posts 2 and 3 the power switch 20 may then be closed permitting current to flow from the source of supply through the terminal post 4, the switch 20, the fuse 18 to the heel of the first single point rotary contact member 15 of the selector gang switch 14. If this selector switch is in the position as shown, the current travels to the contact 15a and thence to the terminal post 2, the test lead 34 to one side of the reclosing mechanism 24. Thus, by placing the selector switch 14 at its first position full line voltage is placed on one side of the reclosing mechanism 24. The voltmeter VL is connected to read the voltage on the test terminal 2.

Upon closing the power switch 20 current also passes from the source of supply, the terminal 4, the switch 20, the three ampere fuse 19 to the post 37 of the variable potential resistance PV and thence through said variable resistance to the single contact member 38, the first switch point 8a of the first switch of the two-gang operated switch 6, the double contact 8 to the switch point 8c, the line 39 which is connected to the single point contact 11 of the first switch of the two-gang operated switch 7, the resistor $R_1$, the line 40, the resistor $R_2$, the line 41 to the point 12a of the second switch, the rotary switch contact 12, the line 42 to the heel of the single switch point 16 of the second switch in the selector gang switch 14. From thence the current travels through the line 43 to the terminal post 3, the lead 35, the double-pole switch points 33 and 27 to the other side of the reclosing mechanism 24. The voltmeter VR is connected to read the voltage on the test terminal 3.

It will be observed that the circuit just traced places the variable potential resistance PV in series with the resistance $R_1$ and $R_2$ for the purpose of placing the lowest voltage on the test terminal 3 and said other side of the reclosing mechanism 24.

Voltmeter VL is connected to show the potential between post 2 and ground and voltmeter VR is connected to show the potential between post 3 and ground.

The setting of the equipment just described places line potential on the side of the reclosing control which is normally connected to 30 and a variable potential on the side of the reclosing control which is normally connected to 31.

In this manner by moving the variable resistor PV and observing voltmeters VL and VR the tester can note at what voltage differential the reclosing control functions and thereby make adjustments when necessary.

The other circuit places the highest potential on the test terminal 2 and the one side of the reclosing mechanism 24, thereby providing extreme conditions of voltage on the automatic resetting mechanism of the circuit breaker simulating an extreme differential in voltage on the lines 22 and 23. This setting of the test equipment is obtained by leaving the selector switch 14 and the variable resistance switches 6 and 7 in their first position as indicated by their separate contact arms connected to the respective points by the letter a.

If the automatic reclosing mechanism 24 of the circuit breaker were to function with this vast differential in potential between the lines it is to connect, it would be obvious to the test man that the mechanism is in need of adjustment which may readily be made on the apparatus so that it will properly respond to the energization of a normal voltage differential condition. However, if the operator found that the reclosing mechanism did not operate to reset the circuit breaker with this abnormal voltage differential he then reduces the resistance in the circuit to the test terminal 3 by manipulating the multiple switch 6 and the series switch 7 until the potential on the test terminal 3 is sufficient to actuate the reclosing mechanism. This potential, being read on the voltmeter VR, provides the operator with a reading which when subtracted from the voltage of the meter VL provides the permissable differential potential between the contacts of the circuit breaker allowing it to close. If this differential potential is too great then the operator readjusts the reclosing mechanism until the permissible differential potential is safe and proper for the resetting mechanism to function.

In order to slowly reduce the voltage on the test terminal 3 the arm 38 of the variable potential resistance PV is moved until it engages the terminal post 37 cutting out the whole of this resistance and leaving only the resistance of $R_1$ and $R_2$ in series. The arm 38 is then moved in the opposite direction to again reinstate the full resistance of this potentiometer and the series switch 7 is turned so that the movable contact members 11 and 12 of the two gangs thereof are connected to switch points 11b and 12b, respectively. This merely eliminates the resistance $R_2$ from the circuit and increases the voltage accordingly. The arm 38 of the variable resistance PV is again moved to the terminal 37 and if the resetting mechanism 24 does not respond to this voltage which is reduced solely in the amount of the resistance of $R_1$ the potentiometer PV is again swung in the opposite direction and the series switch 7 is turned to the third position. The current then travels through the multiple switch 6 as before, the line 39, the resistance $R_1$, the switch contact 11, the switch point 11c, the line 41, the resistance $R_2$, the line 40, the switch point 12c, the switch contact 12 and the line 42 as before, the switch point 16, the line 43 to the test terminal 3 thereby connecting resistances $R_1$ and $R_2$ in multiple in the circuit. Since $R_1$ and $R_2$ in multiple have a lower resistance than $R_1$ the potential will be correspondingly greater on the test terminal 3. The potentiometer PV is then varied until it reaches the post 37 unless the reclosing mechanism 24 responds before the higher voltage is obtained by this adjustment.

By placing the gang series switch 7 in the fourth position, thereby connecting the contacts 11 and 12 to their respective switch points 11d and 12d, both of the resistances $R_1$ and $R_2$ are eliminated from the circuit to increase the voltage on the test terminal 3.

If it is desired to obtain still a higher voltage on the test terminal 3 the multiple resistance switch 6 may be drawn to its second position and series switch 7 in its first, second or third position. This position of the switch 6 places the variable potential resistance PV in multiple with the resistance $R_1$ and $R_2$ which circuit may be made to either include both resistances $R_1$ and $R_2$ in series, as when the switch 7 is placed in its first position; or the resistances $R_1$, as when the switch 7 is placed in its second position; or of the resistances PV, $R_1$ and $R_2$ in multiple, as when the switch 7 is placed in its third position. Thus, any one of the circuits through the resistances $R_1$ and $R_2$ may be provided by means of the switches 6 and 7 for a combination series or multiple connection with the variable potential resistance PV.

After testing the reclosing mechanism with line voltage on one side and a variable voltage on the other in the manner just described a similar test may be conducted with the line voltage on the other side of the reclosing mechanism by moving the three-gang switch 14 to its third position following the same procedure. Such a test will indicate the difference in voltage across the open circuit breaker to determine whether or not each side of the reclosing mechanism will function within predetermined limits of voltage.

If the three-gang, four-position selector switch 14 is moved to its second position so that the contact members 15, 16 and 17 engage their respective b switch points it will be noted that the variable potential circuit, previously described, is eliminated. Current then flows from the power supply through the terminal 4, the power switch 20, the fuse 18, the switch contact 15, the switch point 15b, the terminal 2, the lead 34, the double-pole switch poles 32 and 25 and one side of the reclosing mechanism 24. Thus, full line voltage is again placed on said one side of the reclosing mechanism 24. The negative side 5 of the return line circuit is then connected by the line 44 to the post 45 of the variable load resistance PL, the movable contact 46, the line 47, the switch 13 when closed, the line 48, the heel of the movable switch contact 17, switch pole 17b, the line 43, to the test terminal 3 from whence it is connected to the said other side of the reclosing mechanism 24. Potential is supplied to the test terminal 3 through the reclosing mechanism 24 from the test terminal 2 and the voltmeter VR will read the potential drop across the load resistances PL.

In this test the load resistance PL is set at zero providing a corresponding voltage VR indicating a complete short circuit on the test terminal 3. The reclosing mechanism should of course not function under these conditions. The load resistance is then increased by moving the arm 46 from the post 45 until it includes the whole of the resistance and the voltage VR rises accordingly. If a portion of the variable resistance PL is equivalent to the permissible load on the particular circuit breaker tested the reclosing mechanism 24 will function and the reading of the voltmeter VL and the position of the arm 46 will indicate the setting of the reclosing mechanism relative to the simulated load. If the permissible load is lower than can be simulated with resistance PL along then the arm 46 is turned to the post 45 and the switch 13 is opened to place the fixed load resistance RL in series with this load circuit. The arm 46 is again moved to increase the load resistance until the permissible value is reached at which time the reclosing mechanism will function.

The variable resistance PL is provided with a double scale 50, one for the resistance PL when connected in series with the resistance RL and one for resistance PL only. The two scale readings are calibrated to provide load current values equal to multiples of line potential on the apparatus thus providing the operator with direct readings against which the settings of the reclosing mechanism 24 may be checked and adjusted accordingly.

By moving the gang switch 14 to its fourth position where the points 15d and 17d are made line voltage is placed on the test terminal 3 and load resistance is applied to the test terminal 2 thereby reversing the conditions on the opposite sides of the reclosing mechanism.

In this manner the automatic reclosing mechanism 24 may be checked and reset to properly function for permissible voltage differentials and load resistances without removing or otherwise disturbing the service of the circuit breaker and one may then be assured of the proper operation of each of the circuit breakers after a periodic test. It is also advantageous to reset the automatic reclosing mechanism as the distribution system changes as the coal mine develops so that each circuit breaker is accurately adjusted to function properly in directional feeding and load concentration which conditions may be predetermined and the reclosing mechanism adjusted accordingly.

I claim:
1. A device for testing in service the automatic reclosing mechanism of a direct current circuit breaker having two reclosing control circuits to ground, comprising switch means for alternately and independently connecting the reclosing control circuits to their respective line sides of the circuit breaker contact or to the testing device including a first testing circuit for one reclosing control circuit having a voltage indicating means and having terminals for connection with a voltage supply of line voltage magnitude, a variable resistance, a second testing circuit for the other reclosing control circuit also having voltage indicating means and having said variable resistance connected with said terminals to provide a variable voltage to simulate variable voltage operating conditions on the reclosing control circuits to check their operation.

2. The circuit of claim 1 which also includes selector means to alternately connect said testing circuits to said reclosing control circuits.

3. A device for testing in service automatic reclosing mechanism of a direct current circuit breaker having two reclosing control circuits to ground, comprising switch means for alternately and independently connecting the reclosing control circuits to their respective line sides of the circuit breaker contact or to the testing device, said testing device including a plurality of circuits, a first testing circuit for one reclosing control circuit having a voltage indicating means and having terminals for connecting with a voltage supply of line voltage magnitude, a variable load resistance, a second testing circuit for the other reclosing control circuit also having a voltage indicating means and having said variable load resistance connected to ground to simulate a load condition on the reclosing mechanism to check the operation of the same.

4. The circuit of claim 3 which also includes a selector means to alternately connect said testing circuits to said reclosing circuits.

5. A device for testing in service automatic reclosing mechanism of a direct current circuit breaker having two reclosing control circuits to ground, comprising switch means for alternately and independently connecting the reclosing control circuits to their respective line sides of the circuit breaker contact or to the testing device, said testing device including a plurality of circuits, a variable resistance, a first testing circuit for one reclosing control circuit having a voltage indicating means and having terminals for connecting said variable resistance with a voltage supply of line voltage magnitude, a variable load resistance, a second testing circuit for the other reclosing control circuit also having a voltage indicating means and having said variable load resistance connected to ground to simulate a load condition on the reclosing mechanism under variable voltage conditions to check the operation of the same.

6. The circuit of claim 5 which also includes selector means to alternately connect said testing circuits to said reclosing control circuits.

7. A device for testing in service automatic reclosing mechanism of a direct current circuit breaker having two reclosing control circuits to ground, comprising switch means for alternately and independently connecting the reclosing control circuits to their respective line sides of the circuit breaker contact or to the testing device, said testing device including a plurality of circuits, a variable resistance, two fixed resistances, a resistance switch means to selectively connect said resistances in combinations of parallel and series relations, a testing circuit having a voltage indicating means and having terminals for connecting said resistance switch means with a voltage supply of line voltage magnitude, and selector means to alternately connect to one reclosing control circuit a line voltage and a variable line voltage from said switch means.

8. A device for testing in service automatic reclosing mechanism of a direct current circuit breaker having two reclosing control circuits to ground, comprising switch means for alternately and independently connecting the reclosing control circuits to their respective line sides of the circuit breaker contact or to the testing device, said testing device including a plurality of circuits, a variable resistance, a first testing circuit having a voltage indicating means and having terminals for connecting said variable resistance with a voltage supply of line voltage magnitude, to vary the voltage from zero to line voltage, a variable load resistance, a second testing circuit also having a voltage indicating means and having said variable load resistance connected to ground, and a selector means to connect each of said testing circuits to both reclosing control circuits alternately to check their operation by simulating various voltage and loading conditions.

FRED J. BUCHER.

REFERENCES CITED

The following references are of record in the file of this patent:

UNITED STATES PATENTS

| Number | Name | Date |
| --- | --- | --- |
| 1,253,211 | Chubb | Jan. 15, 1918 |
| 1,645,077 | Tompson | Oct. 11, 1927 |

OTHER REFERENCES

Relay Engineering, by Packard, published by Struthers-Dunn, Inc., 1945, pages 515, 516, 517.

Article entitled "Relay Testing," by Gore, in Electrical Review for February 22, 1946, pages 293, 294 and 295.